United States Patent [19]

McCrosky et al.

[11] 3,965,382

[45] June 22, 1976

[54] ROTOR HAVING BALANCE WEIGHTS

[75] Inventors: Warren N. McCrosky; Dennis F. Peterschmidt, both of Fort Wayne, Ind.

[73] Assignee: General Electric Company, Fort Wayne, Ind.

[22] Filed: Oct. 3, 1974

[21] Appl. No.: 511,512

[52] U.S. Cl. .............................. 310/261; 74/573 R
[51] Int. Cl.² ......................................... H02K 1/22
[58] Field of Search ............ 310/261, 264, 265, 81, 310/43, 42, 61, 211, 157; 74/572, 573; 336/210–213, 216–219; 242/4 R, 4 B; 336/233

[56] References Cited
UNITED STATES PATENTS

| 295,215 | 3/1884 | Whitney | 74/573 |
| 2,089,626 | 8/1937 | Smith | 310/157 |
| 2,688,102 | 8/1954 | Jackson | 310/81 |
| 2,894,367 | 7/1959 | Gingrich | 310/43 |
| 2,953,896 | 9/1960 | Van Horn | 310/43 |
| 3,157,805 | 11/1964 | Hoffmeyer | 310/61 |
| 3,262,000 | 7/1966 | Rediger | 310/261 |
| 3,312,847 | 4/1967 | Waclaw | 310/43 |
| 3,611,829 | 10/1971 | Smith | 74/573 |

Primary Examiner—R. Skudy
Attorney, Agent, or Firm—Ralph E. Krisher, Jr.

[57] ABSTRACT

A rotor for use in an induction type dynamoelectric machine comprising a magnetizable core having a plurality of conductor slots. Nonmagnetic electrically conducting conductors are cast in the slots. An end conductor having at least one weight retaining device for receiving a balance weight is provided. The end conductor interconnects at least some of the slot conductors. The weight mounting device is cast into the end conductor and has an enlarged portion embedded in the end conductor to firmly anchor the weight mounting device therein. The balance weight is positioned on the weight mounting device and fixedly secured thereto.

6 Claims, 9 Drawing Figures

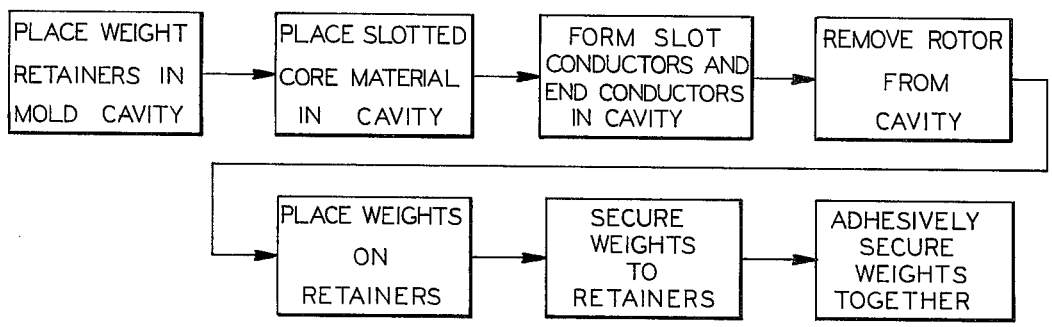
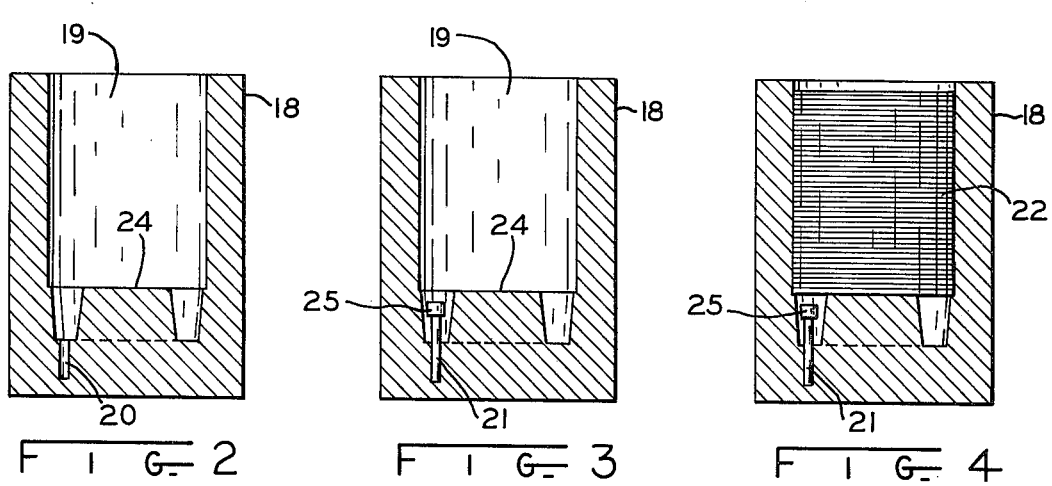
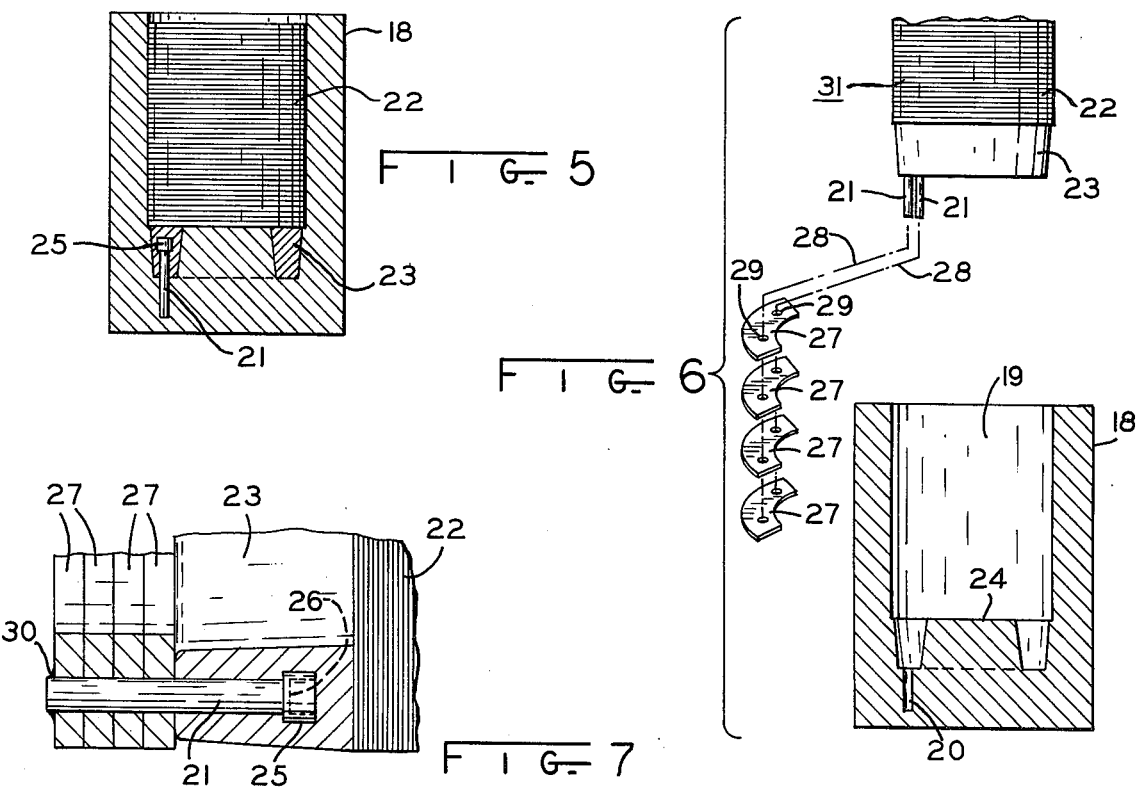

3,965,382

ROTOR HAVING BALANCE WEIGHTS

BACKGROUND OF THE INVENTION

This invention relates generally to the manufacture of dynamoelectric machines and more particularly to an improved means for retaining balance weights on a cast squirrel cage rotor.

In the production of laminated rotors incorporating cast squirrel cage windings, that is, conductor bars integrally joined at each end of a laminated stack by end rings, there has been a practical difficulty in satisfactorily securing relatively heavy balance weights to the rotor. The balance weights are attached to the end rings to compensate for an unbalance in the mass system with which the rotors are associated; e.g., a single piston hermetically sealed refrigeration compressor with a crankshaft introducing a dynamic unbalance into the system. According to a more general practice in the past, balance weights have been attached to the end rings on aluminum projections that were cast integrally with the end rings. This approach, however, may not be satisfactory when using balance weights of a higher mass because of concern that the weights might tear loose during normal operation. Any approach would, more desirably, be one that was economical and simple to practice on a day-to-day basis.

In view of the foregoing, it should now be understood that it would be desirable to provide a balance weight securing means that would be both uncomplicated and inexpensive and yet would securely retain weights of a heavier mass.

Accordingly, one object of the present invention is to provide a rotor with improved means for retaining a balance weight thereon.

SUMMARY OF THE INVENTION

In carrying out the above and other objects of the invention in one form, we provide a rotor for a dynamoelectric machine comprising a magnetizable core having a plurality of conductor slots. Nonmagnetic electrically conducting material is cast in the slots to form slot conductors. In an illustrated embodiment, at least one end conductor having at least one weight mounting means for receiving a balance weight is also cast. The end conductor interconnects at least some of the slot conductors. The weight mounting means is cast into the at least one end conductor and the weight mounting means has a means embedded in the at least one end conductor to firmly anchor the weight mounting means therein. A balance weight is positioned on the weight mounting means and is securely attached thereto so that the balance weight fixedly becomes part of the rotor.

The subject matter which we regard as our invention is set forth in the appended claims. The invention itself, however, together with further objects and advantages thereof may be better understood by referring to the following detailed description taken in conjunction with the accompanying drawings.

BRIEF DESCRIPTION OF THE DRAWINGS

FIG. 1 shows a series of blocks illustrating the method steps that may be followed in practicing the invention;

FIGS. 2 through 6 show a mold cavity along with a rotor in various stages on construction;

FIG. 7 is a fragmentary view of a portion of a rotor with weights attached thereto;

DESCRIPTION OF THE PREFERRED EMBODIMENTS

Figure 8:
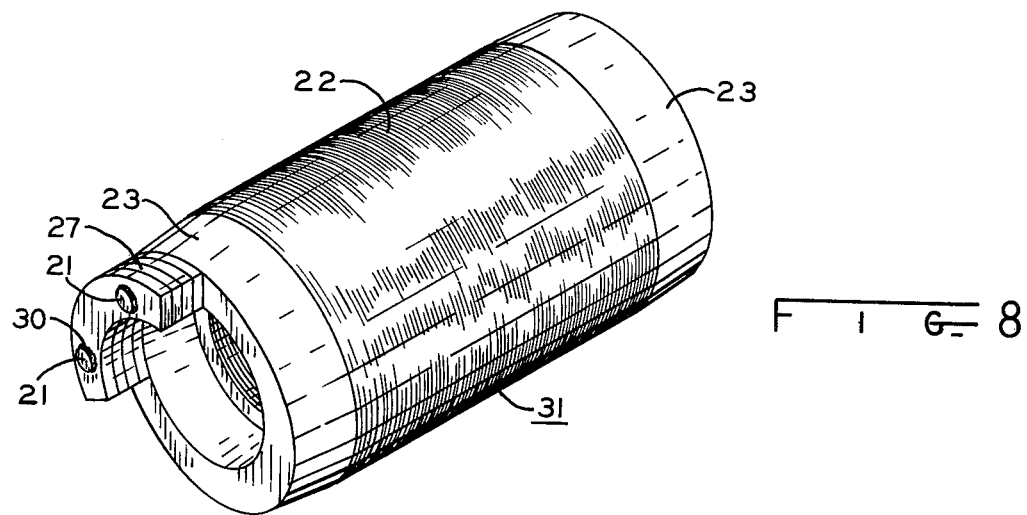
FIG. 8 is a perspective view of a rotor assembly.

Referring now to the drawings, FIG. 1 illustrates in block form a number of steps that may be followed in carrying out our invention in one form thereof. A weight retaining means is placed in a mold cavity which is provided with recesses to accommodate weight retaining means that have been illustrated in the form of studs. Magnetizable rotor core material is then placed in the mold cavity and comes to rest on a shoulder provided in the bottom of the mold cavity, whereupon the mold cavity is closed by an upper die plate. Molten casting material, e.g., aluminum, is then forced into the mold cavity to form slot conductors and end conductors. Once the casting operation is over the rotor assembly including the magnetizable core material along with the cast slot conductors and end conductors and weight retaining means is removed from the cavity. After the rotor assembly has been removed from the mold cavity one or more balance weights can be positioned on the weight retaining means and secured thereto by welding or epoxying. If more than one weight has been used and only the top weight has been welded to the weight mounting means it may be desirable to adhesively secure the weights to each other so that the weights will not be the source of noise once the rotor assembly is installed in an electric motor or so that the weights do not cause fretting corrosion. One method of adhesively securing the weights together would be to dip the balance weight end of a finished rotor in an epoxy varnish and then to cure the epoxy at a suitable temperature as will be understood by persons skilled in the art. The rotor assemblies are baked with the weights down to avoid excessive running of the varnish over the exterior of the rotor assembly.

The details of die casting slot conductors and end conductors are well known in the art and therefore these steps are not set forth in greater detail herein. The details of performing the casting operation are not critical to the use of the present invention, and it is noted that methods of casting conductor slots and end conductors is disclosed, among other things, in U.S. Pat. No. 3,262,000 to A. L. Rediger and J. Slater and assigned to the same assignee as this application. The disclosure of this patent is incorporated herein by reference for purposes of background information.

Casting mold 18 having cavity 19 is shown in FIG. 2. At the bottom of cavity 19 is shoulder 24 and adjacent to shoulder 24 is recess 20. Referring now to FIG. 3, recess 20 accommodates a stud 21. Only a portion of stud 21 extends into recess 20. The portion of weight mounting means 21, not in recess 20, becomes embedded in the end conductor when it is cast. Stud 21 has a head or enlarged portion 25 that may have an opening or other means therein to accept a tool which could be used in placing stud 21 in the mold cavity.

After stud 21 is placed in recess 20, then rotor core 22 is placed in the cavity 19. Rotor core 22 comprises magnetizable core material that may be in the form of a plurality of thin limitations (as illustrated) which are held together by casting material or which may be held together by other means prior to being placed in cavity 19. Alternatively, the magnetizable core material may be in the form of a solid core, edgewise wound body, or so forth.

Mold cavity 19 is enclosed with a top die form (not shown) and molten material such as aluminum is then forced into cavity 19 to form slot conductors and end conductors 23 better seen in FIG. 5. When a casting process is complete, rotor assembly 31 including core 22 and cast slot conductors and end conductors 23 along with stud 21 is removed from mold cavity 18. Once rotor 31 is removed from mold 18, other finishing steps may be performed on rotor 31 such as smoothing of end conductors 23, or if desired balance weights 27 may then be installed on one or more studs 21 prior to any finishing steps. As seen in FIG. 6 balance weights 27 have holes 29 to mate with weight studs 21. It will be understood that any desired number of studs 21 may be used. As indicated by dotted lines 28 weights 27 are installed on studs 21 by utilizing holes 29.

As illustrated in FIG. 7 four balance weights 27 are used and secured to stud 21 by securing means 30. However, it will be understood that as many weights as desired may be used. A required weight can be built up from one large weight or several thin weights. If thin weights are used they may be of steel, brass, aluminum, or any other desirable material, however the outermost weight should be of steel to facilitate welding of one or more studs 21 to the outermost weight. Although other methods of securing weights 27 to stud 21 may be used, such as bonding, welding has been found to be satisfactory.

Note that head 25 of studs 21 are down inside end conductor 23. This assures that stud 21 cannot be pulled out by any overturning force moment that may be encountered during normal operating conditions of rotor 31 in a dynamoelectric machine such as during running or acceleration.

In a preferred form of weight mounting means, it includes a first portion that is cast in the end ring or end conductor and this first portion has means to assure firm anchoring of the weight mounting or retaining means. In addition, the weight mounting means has a portion that extends beyond the end conductor and receives balance weights. It will be appreciated therefore that stud 21, as illustrated, is one preferred form because it fulfills the requirements for a weight mounting or retaining means.

An Allen screw body makes a preferred stud 21 because it is made from a high tensile strength material which provides the required strength and has a head 25 of sufficient size to firmly anchor stud 21 in end conductor 23. Also the recessed hexagon wrench socket 26 in the head provides a good method of holding weight mounting means 21 on a tool while inserting weight mounting means 21 in a mold cavity prior to casting. It will of course be recognized that means other than head 25 could be used to assure the firm anchoring of stud 21 in end conductor 23, such as serrations along stud 21 or a slot or groove around the circumference of stud 21.

Completed rotor assembly 31 is shown in FIG. 8 with the outer diameter thereof machined (like FIG. 7) and with an end conductor 23 on both ends thereof. Weights 27 are shown fitted on two studs 21.

Figure 9:
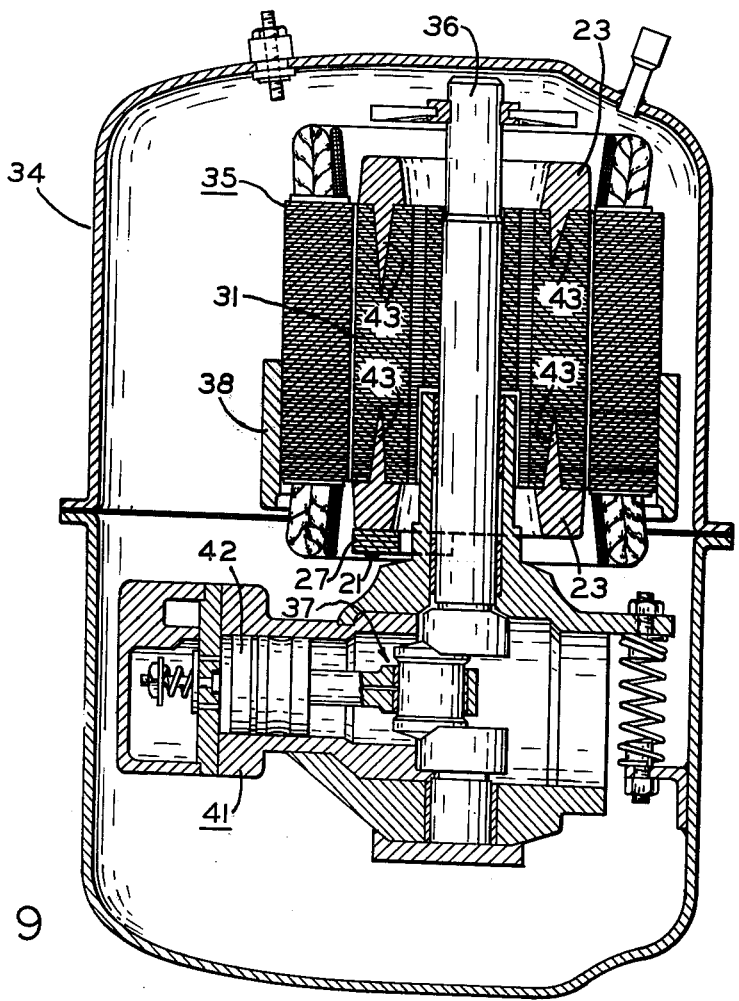
FIG. 9 is a sectional view of an electric motor and compressor assembly in which the invention is embodied.

Rotor assembly 31 is shown assembled into dynamoelectric machine 35 and connected to crankshaft and piston assembly 37 in FIG. 9. Dynamoelectric machine 35 and compressor 41 are enclosed in hermetically sealed casing 34. Rotor assembly 31 is mounted on rotatable shaft 36 which is an integral part of the crankshaft driving piston 42. Dynamoelectric machine 35 is mounted in shell or motor frame assembly 38. The sectionalized view of dynamoelectric machine 35 and rotor 31 show slot conductors 43.

Slot conductors 43 are continuous from one end of rotor assembly 31 to the other end. As illustrated, rotor assembly 31 is a skewed rotor or, in other words, the slot conductors do not travel parallel to the axial plane of the rotor but are skewed from such plane. Therefore it will be understood why in FIG. 9 slot conductors 43 do not appear continuous (as drawn) from one end of rotor assembly 31 to the other end.

Although balancing weights 27 are shown mounted on the compressor end of rotor assembly 31 it will be understood that balancing weights 27 could just as well be mounted on the opposite end of rotor assembly 31. Other illustrated features of the structure shown in FIG. 9 are known to persons skilled in the art and are not repeated in the interest of clarity of description. And although the invention is described in conjunction with a hermetically sealed compressor and motor assembly it will be understood that the invention could be used in other devices.

While the present invention has been described with reference to preferred embodiments of our invention, it will be understood that numerous modifications may be made by one skilled in the art which are within the scope of this invention, and we therefore intend in the following claims to cover all such equivalent variations that fall within the true scope and intent of the invention.

What we claim as new and desire to secure by Letters Patent of the U.S. is:

1. A rotor for use in an induction type dynamoelectric machine comprising a magnetizable core having a plurality of conductor slots; slot conductors of nonmagnetic electrically conducting material cast in the slots; at least one end conductor having at least one weight mounting means for receiving a balance weight, the end conductor interconnecting at least some of the slot conductors; and a balance weight; the weight mounting means being a stud having an enlarged portion with the enlarged portion cast into the at least one end conductor, said enlarged portion being embedded in the at least one end conductor to firmly anchor the weight mounting means therein; and the balance weight being positioned on the stud and being secured thereto so that the balance weight fixedly becomes part of the rotor.

2. The rotor of claim 1 wherein the stud includes means for facilitating the insertion of the weight mounting means in a mold prior to casting the end conductor; said means for facilitating including a tool receiving portion.

3. The rotor of claim 1 wherein the balance weight is welded to the weight mounting means.

4. A cast squirrel cage rotor for a dynamoelectric machine, said rotor comprising: at least one stud having a first end thereof embedded in an end ring of the rotor, said stud having a portion that extends beyond the end ring; at least one weight securely attached to the portion of the stud that extends beyond the end ring; and said stud including anchor means embedded in the end ring to ensure that the stud and at least one weight remain assembled together.

5. A cast squirrel cage rotor for a dynamoelectric machine, aid rotor comprising: first means for mounting at least one weight cast into an end ring of the rotor so that a portion of the first means extends beyond the end ring, at least one weight securely attached to the portion of the first means that extends beyond the end ring, and second means located on the first means and embedded in the end ring to ensure that the first means and the at least one weight remain assembled together during normal conditions; said first means comprising a stud having a first portion embedded in the end ring and a second portion extending from the end ring, and said second means comprising a headed portion of the stud; the at least one weight being securely attached to the second portion of the stud between the end of the stud and the end ring.

6. An improved rotor for use in a dynamoelectric machine including a stack of laminations having a plurality of conductor slots, conductors of nonmagnetic electrically conducting material cast in the slots and interconnected at each end of the stack by cast annular end rings of the same material as the conductors to form a cast squirrel cage winding wherein the improvement comprises: at least one stud partially embedded in at least one of the cast end rings, the stud having a first diameter and having a length greater than the first diameter, one end of the stud being of a greater diameter than the first diameter, and wherein the end of greater diameter is embedded in the cast end ring to prevent any rotational forces of the rotor from dislodging the stud; and a plurality of thin flat weights having at least one stud accommodating hole therein positioned on the at least one stud, the at least one stud being welded to a top one of the plurality of weights and thereby fixedly retaining the weights on the at least one stud.

* * * * *

UNITED STATES PATENT OFFICE
CERTIFICATE OF CORRECTION

PATENT NO. : 3,965,382
DATED : June 22, 1976
INVENTOR(S) : Warren N. McCroskey and Dennis F. Peterschmidt It is certified that error appears in the above-identified patent and that said Letters Patent are hereby corrected as shown below:

Inventor's name spelled incorrectly; delete "McCrosky" and insert -- McCroskey --.

Col. 5, line 2, delete "aid" and insert --said--.

Signed and Sealed this

Seventh Day of September 1976

[SEAL]

Attest:

RUTH C. MASON
Attesting Officer

C. MARSHALL DANN
Commissioner of Patents and Trademarks